I. H. JEWELL.
FILTERING APPARATUS.
APPLICATION FILED FEB. 4, 1907.
944,194.
Patented Dec. 21, 1909.
Fig. 1.
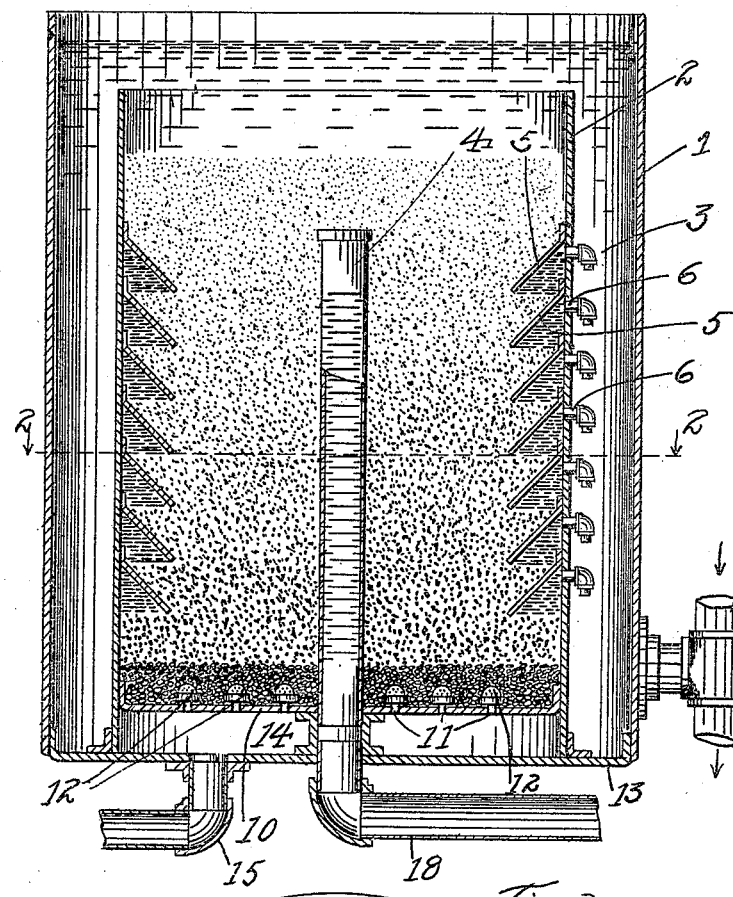
Fig. 3.
Fig. 2.
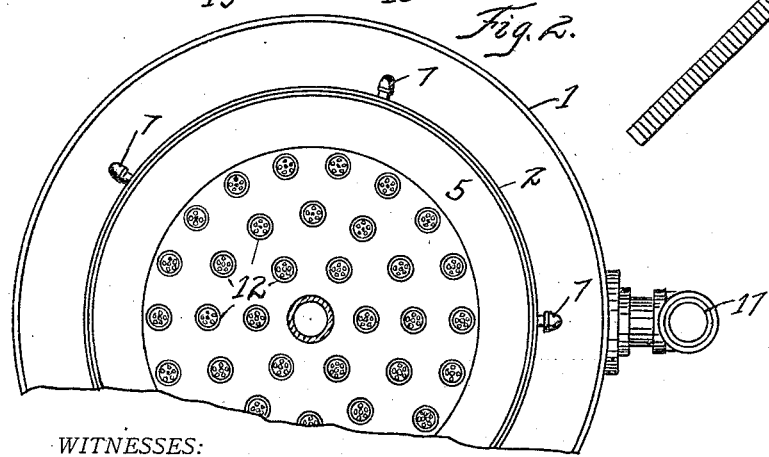
WITNESSES:
Charles J. Cobb
C. E. Jordan
INVENTOR.
Ira H. Jewell,
BY Hill & Hill,
ATTORNEYS.

UNITED STATES PATENT OFFICE.

IRA H. JEWELL, OF CHICAGO, ILLINOIS.

FILTERING APPARATUS.

944,194. Specification of Letters Patent. Patented Dec. 21, 1909.

Application filed February 4, 1907. Serial No. 355,549.

*To all whom it may concern:*

Be it known that I, IRA H. JEWELL, a citizen of the United States, residing at Chicago, in the county of Cook and State of Illinois, have invented certain new and useful Improvements in Filtering Apparatus, of which the following is a description.

My improvement belongs to that general class of filters in which the fluid percolates through a granular bed in a horizontal or lateral direction to a receiving core positioned in the bed and thence to the clear well.

The object of my invention is to improve the method of filtration referred to, and to provide simple and effective means for cleansing the filter bed.

To this end my invention consists in the novel processes shown and described and more particularly pointed out in the claim.

In the drawings wherein like reference characters indicate like or corresponding parts, Figure 1 is a vertical, sectional view of a filter illustrating my improvement; Fig. 2 is a transverse section of the same on line 2—2 of Fig. 1 with the granular bed removed, and Fig. 3 is a detail view.

In the drawings 1 illustrates an outer tank having an inner tank 2 positioned therein and spaced therefrom, leaving an annular chamber 3.

4 is a receiving core positioned within the bed of the filter.

5—5 are hoods attached to and downwardly inclined from the inner tank 2.

6—6 are nipples extending from the annular chamber 3 through the tank 2 beneath the hoods 5. It is not only desired that fluid should readily pass through the nipples in a direction toward the filter bed, but that fluid may not pass in the reverse direction therethrough, therefore I arrange some form of valve mechanism in connection with each of the nipples to secure such action.

As shown in Fig. 3, each of the nipples 6 is provided with an elbow 7 provided with a valve seat 8 and a ball valve 9. It will be readily seen that there will be a space or chamber beneath each of the hoods 5 to which the fluid is readily admitted and from which the fluid readily percolates laterally toward the core 4.

The inner tank 2 is provided with a bottom 10 having a plurality of apertures 11 therethrough, each having an upwardly extended sieve or rose 12. The outer tank 1 is provided with a bottom 13, the bottom 10 being spaced from the bottom 13 to leave a chamber 14.

A wash pipe 15 connects with the chamber 14, by means of which fluid may be forced into said chamber and thence upward cleansing the filter bed and overflowing the top of the tank 2 and escape by the outlet 16. Suitable valves serve to direct the direction of the flow of the fluid. Thus when in operation as a filter the fluid may be admitted through the pipe 17 to the annular chamber 3, preferably rising substantially to the level indicated in the drawing. The fluid readily enters laterally as described, and in the preferred operation some of it may also percolate downward to the core.

When it is desired to cleanse the filter bed the pipe 17 is closed and the pipe 16 opened.
The outlet pipe 18 to the core is also closed while the pipe 15 is opened and a reverse current serves to agitate and thus cleanse the bed, the wash water rising to the top of the tank 2, overflowing into the annular chamber 3 and thence outward through the pipe 16. By reason of the valved openings beneath the hoods, no fluid may escape in that direction during the washing operation and hence there will be no tendency for the material composing the filter bed to rise within and beneath the hoods thus interfering with their operation. As shown in Fig. 2 in the preferred construction the inner tank 2 is provided with means for admitting the fluid at various points around the circumference of the tank.

Having thus described my invention, what I claim as new and desire to secure by Letters-Patent is:

A filter comprising an outer receptacle and an inner receptacle open at the top, of a series of superposed, annular, and inclined hoods secured to the inner wall of the inner receptacle, a filling of filtering material for said inner receptacle, said hoods serving to maintain a series of annular pockets of the liquid to be filtered about the edge of the body of filtering material, said inner receptacle being spaced and separated from the outer receptacle at the bottom, a series of check valves located in the wall of the inner receptacle and adapted to permit the passage of fluid into the annular pockets but to prevent the passage of liquid therefrom.

In testimony whereof, I have hereunto signed my name in the presence of two subscribing witnesses.

IRA H. JEWELL.

Witnesses:
 Roy W. Hill,
 Charles I. Cobb.